Figure 1:
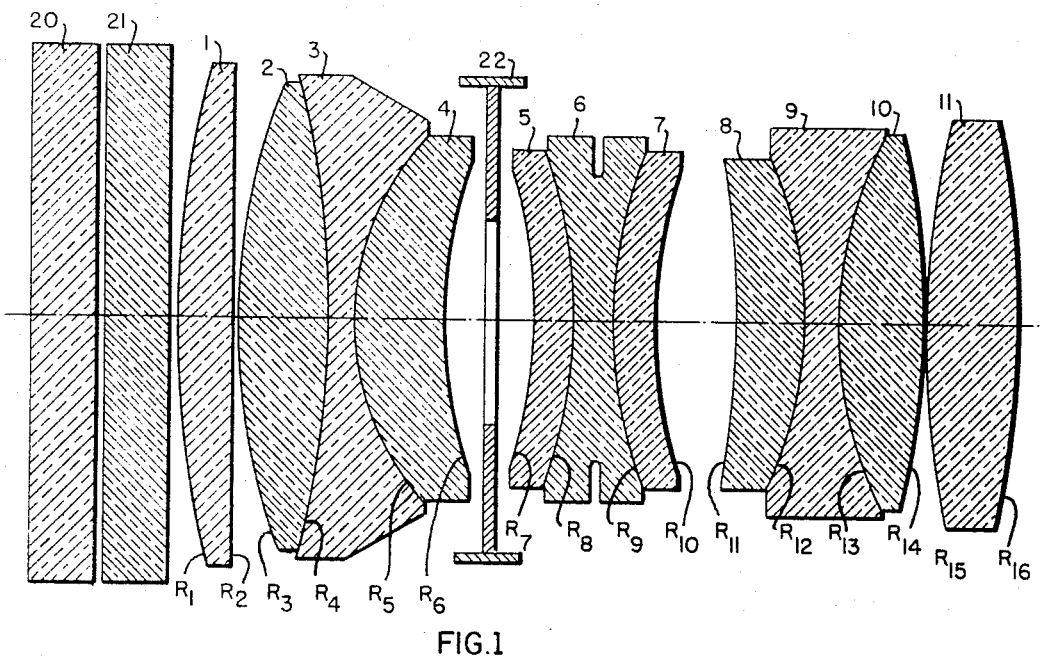

Feb. 28, 1967   J. G. BAKER   3,306,695
RELATIVELY WIDE-ANGLE APOCHROMATIC OBJECTIVE LENS SYSTEM
Filed May 22, 1963

United States Patent Office  3,306,695
Patented Feb. 28, 1967

3,306,695
RELATIVELY WIDE-ANGLE APOCHROMATIC
OBJECTIVE LENS SYSTEM
James G. Baker, Winchester, Mass., assignor to Fairchild Camera and Instrument Corporation, a corporation of Delaware
Filed May 22, 1963, Ser. No. 282,382
10 Claims. (Cl. 350—189)

This invention relates to high-resolution objective lens systems which are particularly applicable to aerial cameras.

In applicant's prior Patent 2,628,532, there are described and claimed a very wide-angle objective lens system of moderate resolution and including lens components providing corrections for spherical and chromatic aberrations, both axial and oblique, as well as coma, astigmatism, and field curvature and generally referred to as an apochromatic lens system, that is, a system having the capability of bringing to a focus at a common point incident light of at least three colors widely separated in the spectrum to which the film is sensitive. That lens system was designed and intended primarily for use in night aerial photography by flash illumination and represents a compromise between desired high resolution and the necessity of operation at relatively low levels of illumination.

The present invention is directed to an objective lens system constituting a modification of that described and claimed in aforesaid Patent 2,628,532 and its principal object is to provide an apochromatic objective lens system designed for high-altitude, high-resolution aerial photography by daylight under conditions of relatively higher illumination than those for which the lens system of aforesaid prior patent was intended. Because of the relatively high level of illumination and high altitude at which the system is intended to operate, the field angle of the lens system is made only relatively wide but this still imposes stringent corrections for spherical and chromatic abberations, both axial and oblique, as well as coma, astigmatism, and field curvature, if high resolution is to be achieved. While apochromatic objective lens systems have been available, they can be obtained only in such slow-speed forms as not to be satisfactory for use in high-speed, high-resolution aerial cameras. Attempts to increase the speed of the lens system have resulted in an inordinate number of lens elements in order to keep the individual internal lens powers within reasonable limits.

It is a further object of the invention to provide an apochromatic relatively wide-angle objective lens system characterized by high acuity, superior correction for curvature of field, both axial and oblique aberrations, and correction for spherical aberration, coma, astigmatism, and distortion. Stated in another way, it is an object of the invention to provide a new and improved moderately wide-angle objective lens system which will give effectively the performance of a telescopic lens for a relatively wide viewing angle; that is, it will give a resolution that is effectively diffraction limited.

It is a still further object of the invention to provide a new and improved relatively wide-angle objective lens system which provides high acuity performance for incident light of a wide range of wave lengths within the spectrum equal to, or superior to, that previously obtainable only with substantially monochrome incident light and which, at the same time, requires only a reasonable number of lens elements.

In accordance with the invention, there is provided a relatively wide-angle apochromatic substantially symmetrical objective lens system comprising a first front lens component of net collective effect, a fifth rear lens component of net collective effect, and second, third, and fourth spaced lens components disposed between the front and rear lens components, each comprising at least three closely associated lens elements. The second lens component of the system has a net positive dioptric power and index of refraction differences between adjacent lens elements lying within the range 0.03 to 0.09. The third lens component of the system has a net negative dioptric power and index of refraction differences between adjacent lens elements within the range of 0.02 to 0.12, while the fourth lens component has a net positive dioptric power and index of refraction differences between adjacent lens elements within the range of 0.01 to 0.09. The term "closely associated lens elements" is used herein and in the appended claims to refer to lens elements spaced by not more than a few wave lengths of the incident light, such space being occupied by a binding cement, air, or suitable protective medium, in any case the adjacent surfaces of adjacent lens elements acting effectively as a single refractive surface.

For a better understanding of the present invention, together with other and further objects thereof, reference is had to the following description, taken in connection with the accompanying drawing while its scope will be pointed out in the appended claims.

Figure 2:
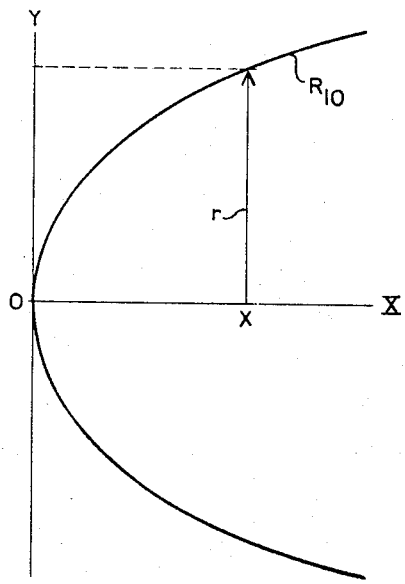

Referring now to the drawing:
FIG. 1 represents the surface contours of the lens elements of the objective lens system of the invention in the longitudinal axial plane, and
FIG. 2 is a diagram to aid in the explanation of the method for determining the aspheric surfaces of certain elements of the lens system of FIG. 1.

The general principles involved in the design of an objective lens system of the type to which the invention relates, as well as important design criteria, are discussed in applicant's aforesaid Patent 2,628,532 and need not be repeated. The surfaces of the individual aspheric lens elements are largely determined by empirical calculation, although certain formulae are of assistance in reducing the number of required computations, as explained hereinafter.

Referring now to FIG. 1 of the drawing, there is represented a relatively wide-angle apochromatic objective lens system comprising eleven lens elements approximately symmetrical about a median plane. Preceding the lens system is a pair of planar windows 20, 21, normally included in the camera for protection of the lens elements and particularly their critical surfaces. The system of FIG. 1 includes eleven lens elements, for convenience numbered serially 1–11, inclusive, having surfaces identified serially as R1–R16, inclusive. The front and rear lens components (first and fifth components) comprise the simple noncomposite elements 1 and 11, respectively. The lens element 1 is plano-convex while the element 11 is bi-convex and each has a net collective effect. Between the lens elements 1 and 11 are second, third, and fourth spaced lens components each comprising at least three closely associated lens elements. The second lens component is a triplet comprising the lens elements 2, 3, and 4 and has a net positive dioptric power. The difference between the indices of refraction of each adjacent pair of lens elements of component 2, 3, 4 lies within the range of 0.03 to 0.09. If this difference becomes less than 0.03, the curvatures of the system become enhanced and the speed of the system, for a given performance, is commensurately limited. If the difference exceeds 0.09 and if the secondary spectrum is also to be eliminated, it is not possible to eliminate the spherical aberration of the system as a whole without excessive aspheric corrections. This lens component includes at least one element, specifically the lens element 3, of negative dioptric power and a reduced dispersive power for the blue-violet end of the spectrum characteristic of crown-glass elements. The element is preferably made of a short flint glass having such characteristic but a desirably lower dispersion index or Abbé number $v$. The lens element 3 is disposed between and closely associated with elements 2 and 4, each of positive dioptric power. The second lens component 2, 3, 4 has a concave exterior surface R6 on the short conjugate side of the system of a curvature C preferably lying within the range of 3 to 5 so that the radius of curvature of the surface falls within the range of 0.33 to 0.2 in terms of the equivalent focal length of the system. If the radius of curvature of surface R6 is made longer than 0.33, a large amount of negative dioptric power must be provided by the central lens component, with consequent impairment of the correction of oblique aberrations, and it becomes difficult to achieve adequate spherical correction of the system without excessive curvatures of the surfaces of the central lens component. If the radius of curvature of surface R6 is made shorter than 0.2, it becomes increasingly difficult to compensate the oblique spherical aberration.

The objective lens system of FIG. 1 also comprises a third lens component which is also a triplet comprising three lens elements 5, 6, and 7 and having a net negative dioptric power. The difference between the indices of refraction of each adjacent pair of lens elements of component 5, 6, 7 lies within the range of 0.02 to 0.12. The position of this third or central lens component renders it somewhat insensitive to choice of glass so that the range of index differences of the lens elements of this component is preferably increased to correspond to the effects shown by the second and fourth lens components. The lens component 5, 6, 7 is generally bi-concave in form, comprising lens elements 5 and 7 of positive dioptric power enclosing and closely associated with the lens element 6 of negative dioptric power. At least one of the exterior surfaces R7, R10 of the lens component 5, 6, 7, and preferably both, is aspheric in form to correct for axial aberration of the system. At least one of the interior surfaces of the lens component 5, 6, 7, and preferably both of the surfaces R8, R9, is also aspheric to correct for off-axis aberration. Actually, all of the surfaces of the lens component 5, 6, 7 are preferably aspheric to effect both axial and off-axis corrections for spherical aberration, coma, and chromatic variations of spherical aberration and coma.

The lens system of FIG. 1 further comprises a fourth lens component which is also a triplet comprising the lens elements 8, 9, and 10 and is designed to have a net positive dioptric power. The difference between the indices of refraction of each adjacent pair of lens elements of the component 8, 9, 10 lies within the range of 0.01 to 0.09 and the index difference across the surface R12 preferably lies within the range 0.01 to 0.03. It has been found by calculation that it is advisable to use a smaller index difference with strong dioptric power at the interior surface R13 of this fourth component on the short conjugate side of the lens system in order to eliminate the tendency of the system, in conjunction with the aspheric surfaces, to develop a higher order asymmetry in the off-axis image. Calculations show that, for systems of intermediate field angle, this index difference should be kept small. For larger field angles, the difference is preferably increased and the curvature reduced, commensurately reducing the speed of the lens system. The fourth lens component 8, 9, 10 has an over-all meniscus form with a convex exterior surface R14 on the short conjugate side of the system. This lens component comprises two lens elements 8, 10 of positive dioptric power enclosing and closely associated with the lens element 9 of negative dioptric power. The latter has a dispersive power for the blue-violet end of the spectrum characteristic of crown-glass elements. This lens element 9 is therefore preferably made of a short flint glass. The interior surface R13 is convex toward the long conjugate side of the system.

An aperture stop 22, of any conventional form, is disposed in one of the interlens component spaces, preferably adjacent to the concave exterior surface R6 of the second lens component 2, 3, 4.

There are a number of preferred design parameters for the lens system of FIG. 1. Preferably, no lens element of the second and fourth lens components of positive dioptric power has an index of refraction less than 1.57. Preferably, each of the second, third, and fourth lens components comprises a cemented triplet although, if desired, the lens elements of each of these lens components may be separated by a small air space of a length not exceeding a few wave lengths of the incident light without affecting the fundamental design of the lens system, as described hereinafter. The lens elements of positive dioptric powers of each of the several lens components systematically have higher indices of refraction than the lens elements of negative dioptric powers.

Referring now to FIG. 2, there is illustrated a longitudinal section of one of the aspheric surfaces, for example surface R10 of the lens component 5, 6, 7 with the curvature greatly exaggerated for clarity of illustration. The general equation defining the configuration of any such aspheric surface is as follows:

$$x=\frac{Cr^2}{1+\sqrt{1-C^2r^2}}+br^4+cr^6+dr^8+er^{10} \qquad (1)$$

where $r^2=y^2+z^2$ $x$, $y$, and $z$ are the Cartesian coordinates of any point on the surface with the origin referred to the vertex of the surface $r$ is the distance of a point on the surface in the Y–Z plane from the X-axis, i.e., the zone height $b$, $c$, $d$, and $e$ are coefficients representing the aspheric departure of the point from a spherical surface of contact radius $C$ is the reciprocal of the radius of curvature at the vertex, the so-called contact radius, and is also the curvature at the vertex.

If the surface is a surface of revolution, as in the instant case, only the $x$ and $y$ coordinates of the surface in the meridional plane need be considered and Equation 1 becomes:

$$x=\frac{Cy^2}{1+\sqrt{1-C^2y^2}}+by^4+cy^6+dy^8+ey^{10} \qquad (2)$$

The coefficients $b$, $c$, $d$, and $e$ of Equations 1 and 2 are determined by the solution of simultaneous equations arrived at from calculations of the various aberrations of on-axis and off-axis rays.

There are given below, in Table I, the design constants for one specific objective lens system embodying the invention having an equivalent system focal length of 1.00000 and a relative aperture $f/4$. The data may be scaled to any particular actual focal length by multiplying all dimensional quantities by the desired focal length in any desired unit of lineal dimension. In one practical embodiment constructed in accordance with the design constants of Table I, the actual focal length was 24 inches.

TABLE I

| Lens | Surface¹ Radii = R | | Thickness¹ (a = air) (g = glass) | Index of Refraction $n_d$ | Dispersion Index $v$ | Glass Type |
|---|---|---|---|---|---|---|
| 1 | R1 | 0.77304 | 0.03665g | 1.62041 | 60.29 | SK-16 Dense crown. |
|   | R2 | plano | 0.00156a | | | |
| 2 | R3 | 0.38205 | 0.05459g | 1.60311 | 60.68 | SK-14 Dense crown. |
| 3 | R4 | −0.64988 | 0.02028g | 1.55781 | 53.84 | KzFS-2 S-Glass. |
| 4 | R5 | 0.15723 | 0.05771g | 1.60311 | 60.68 | SK-14 Dense crown. |
|   | R6 | 0.27852 | 0.05069a | | | |
| 5 | R7 | Aspheric | 0.02963g | 1.62041 | 60.29 | SK-16 Dense crown. |
| 6 | R8 | Aspheric | 0.01638g | 1.53172 | 48.87 | LLF-6 Extra light flint. |
| 7 | R9 | Aspheric | 0.03587g | 1.60311 | 60.68 | SK-14 Dense crown. |
|   | R10 | Aspheric | 0.04243a | | | |
| 8 | R11 | −0.79292 | 0.04367g | 1.62041 | 60.29 | SK-16 Dense crown. |
| 9 | R12 | −0.26879 | 0.02340g | 1.55781 | 53.84 | KzFS-2. |
| 10 | R13 | 0.26195 | 0.05303g | 1.57250 | 57.48 | Ba K-1. |
|    | R14 | −0.56106 | 0.00390a | | | |
| 11 | R15 | 1.11249 | 0.04679g | 1.62041 | 60.29 | SK-16 Dense crown. |
|    | R16 | −1.88459 | 0.71615a | | | |

¹ The dimensions of surface radii and axial thickness of glass and air layers are in terms of decimal fractions of the paraxial focal length, so that these dimensions may be utilized in designing homologous lens systems having different focal lengths.

The specific example of objective lens system, of which the essential parameters are given in Table I, has been designed assuming the use of types of optical glass for the central lens elements 3 and 9 of the lens components 2, 3, 4 and 8, 9, 10, respectively, known to be favorable for the reduction of secondary spectrum, specifically, glass generally known as KzFS-2. However, other short flints or borate flints, such as KzF-5, KzF-6, KzFS-1, or KzFS-4 may be substituted for the KzFS-2. It is essential, however, that the outer lens elements surrounding the central elements of these lens components have higher indices of refraction and higher indices of dispersion $v$.

There follow, in Table II, the preferred ranges of dioptric powers and refractive indices, and range of refractive index differences for an objective lens system having the design parameters of Table I.

TABLE II

| Lens | Range of Dioptric Powers (Percent of Total) | Range of Refractive Indices | Range of Refractive Index Differences |
|---|---|---|---|
| 1 | 0.7 to 0.9 | 1.57–1.80 | |
| 2 | 2.0 to 3.0 | 1.57–1.67 | |
| 3 | −3.0 to −5.5 | 1.50–1.64 | 0.03–0.09 |
| 4 | 3.0 to 5.0 | 1.57–1.67 | 0.03–0.09 |
| 5 | 0.7 to 1.4 | 1.53–1.64 | |
| 6 | −3.0 to −5.5 | 1.50–1.62 | 0.02–0.12 |
| 7 | 1.2 to 2.7 | 1.53–1.64 | 0.02–0.12 |
| 8 | 1.0 to 2.0 | 1.54–1.67 | |
| 9 | −3.0 to −5.5 | 1.50–1.64 | 0.01–0.09 |
| 10 | 2.0 to 4.0 | 1.51–1.67 | 0.01–0.09 |
| 11 | 0.7 to 1.0 | 1.57–1.80 | |

The ranges of dioptric powers and refractive indices set out in Table II were arrived at by a combination of empirical and analytical methods. A large number of equations of conditions for determining all types of aberration over the field of the lens system were set up in terms of dioptric powers, lens thicknesses and separations, indices of refraction, and $v$ values. These equations were solved simultaneously and by iteration, the coefficients being adjusted to meet the desired specifications for spectrum response, light transmission, stability of characteristics of selected glasses, lens angle, permissible dimensional tolerances, weight, etc. Successive solutions to the simultaneous equations converged to the final design represented by Tables I and II.

The effects of exceeding the indicated ranges of dioptric powers and refractive indices of the several lens elements, as set out in Table II, are as follows:

If the dioptric power of lens element 1 is weaker than 0.7, too much of the remaining burden of positive power is placed onto the net dioptric power of lens element 2, resulting in an imbalance in the system with respect to distortion or of coma, or of both, in the fifth and higher orders. If lens element 1 has a higher dioptric power than 0.9, there results a large value for the fifth and higher order astigmatism that cannot be adequately compensated by the remaining parameters of the system for a relatively wide-angle high-acuity system giving a flat image field. Similarly, if the index of refraction of lens element 1 falls below 1.57, the associated curvatures become excessive, leading to the same difficulties. If the index were to be greater than 1.80, there are no existing optical glasses having a sufficiently large $v$ value to allow for color correction in an adequate sense by the rest of the system.

If the dioptric power of element 2 is less than 2.0, the deficiency would have to be shifted to the front element which would become too strong and have the objections already cited. If the dioptric power becomes greater than 3.0, either at the expense of lens element 1 with objections already cited or at the expense of element 4, the cemented surface R4 becomes entirely too strong optically, leading to fifth and higher order asymmetries in the refractions lying outside of acceptable limits on high-acuity performance.

If the dioptric power of lens element 3 is weaker than −3.0 negatively, adequate color correction could not be effected when at the same time a short flint glass must be used, as described elsewhere. Indeed, it will be noted that the negative dioptric correction is fairly well distributed between lens elements 3, 6, and 9 in nearly equal shares, thus preserving full color correction of the several orders of longitudinal color and, through symmetry, preserving the full color correction of the several orders of lateral color. Any marked imbalance in this distribution of negative dioptric powers will upset one or more of these sensitive aberrations. If the negative dioptric power is greater than −5.5, not only will the indicated imbalance occur but the fifth and higher order monochromatic conditions will also be upset by the excessive curvatures associated with the higher powers.

Lens element 4 shares its dioptric power more or less symmetrically with lens element 2 and with lens elements 8 and 10, where it must be kept in mind that the system as a whole has the long conjugate object plane at infinity or at least such that the long conjugate side is substantially longer than the short conjugate side. The symmetry is therefore more one of balancing out the various refractions among the rays over the field and among the surfaces, as if the largest refractions were to be minimized by bringing up the smallest refractions toward a mean value. Under these circumstances, no one ray is excessively refracted, leading to aberrations, and not many rays are too weakly dealt with. If lens element 4 lies outside the dioptric range given, if too weak, it shifts an unacceptable burden to lens elements 2 and/or 1 and, if too strong, it also introduces an unacceptable fifth and higher order aberration of the rim rays to the outer field, including the chromatic variations of the refractions involved.

The distribution of the ranges of indices of refraction for the lens elements 2, 3, and 4 is determined by color correction of the system involving the matching of a short flint glass of a particular $\nu$ value and index within the range from 1.50 to 1.66 to adjacent crown glass elements of adequately higher $\nu$ values and indices as given in Table II. If the indices are lower than 1.57 for the positive elements, the difficulties cited elsewhere in the specification arise. If the index of lens element 4 is greater than 1.67, color correction, including the reduction of secondary spectrum, becomes impossible for combinations with known short flint glass negative elements. The range of indices given for the desired short flints covers those of currently available glasses from ZK–N7 to KzFS–5.

The third lens component comprises lens elements 5, 6, and 7, element 6 being a centrally located normal light flint glass. The function of this triplet is to take up a reasonable amount of negative dioptric power of the system in the central air space that otherwise would lead to excessively strong curvatures for the adjacent concave air surfaces of the second and fourth lens components (lens triplets 2, 3, 4 and 8, 9, 10). The net dioptric power is therefore negative but not very greatly so. With this construction, opportunity is then taken of distributing the refractions among the four surfaces involved to favor the higher order monochromatic and chromatic conditions. In addition, these surfaces have been chosen for the distribution of aspheric powers in the several higher orders to complete the corrections for the strongest refractions, both monochromatically and chromatically, for off-axis rays as well as the extreme rim rays on axis.

If the positive lens elements 5 and 7 have dioptric powers outside of the ranges given, either the cemented surfaces become too strongly curved and lead to unacceptable higher order refractions or, on the low side, become too weak to complete the color correction and to carry out the function of breaking down the negative powers of the system among acceptable curvatures. Similarly, if the negative dioptric power of lens element 6 is too weak, color correction cannot be adequately effected, particularly since the construction of the lens system as a whole prevents having thinner elements or a much shorter axial distance between opposing surfaces of the second and fourth lens components. If the dioptric power in a negative sense of element 6 becomes too strong, then once again the cemented curvatures become too strong with consequent damage to the higher order extreme refractions, both mono and heterochromatically.

The ranges of dioptric powers and refractive indices of lens elements 8, 9, and 10 follow very closely the discussion above for lens elements 2, 3, and 4. In general, the demands of symmetry, particularly with respect to chief ray refractions and to far off-axis coma correction, lead to a more or less symmetrical arrangement vis-a-vis the component comprising lens elements 2, 3, and 4.

The range of dioptric powers and the range of refractive indices of lens element 11 follow closely the discussion for lens element 1. It must be recognized that the requirements of symmetry for all lateral aberrations, including distortion, lateral color, coma, and the higher chromatic variants of these, all lead to a type of balance between the front and the rear of the system. For the extreme case of 1:1 imaging between finite conjugates, it is well known that complete symmetry of construction on either side of a central stop will rid the performance of all lateral asymmetries. In this instance, the first and last lens elements would be identical. However, in the case at hand where one conjugate greatly exceeds the other, the symmetry must be redefined and some differences between the dioptric powers and the lens shapes of the first and last elements are to be expected, but within rather definite ranges. The designer simply chooses the values to satisfy the governing aberrational equations, which then come out to yield lens elements between front and rear somewhat but not totally alike. The ranges of Table II take this into account. For such a long conjugate, lens element 11 lies somewhat lower in the ray height so that its uppermost limit on dioptric power can be slightly larger without introducing excessive aberrations. For the same reason, lens element 10 can have a slightly greater dioptric power than lens element 2, etc. On the other hand, lens element 8 cannot have any very great dioptric power without introducing very strong refractions for the lower rim rays to the outer field. The range given of only 1.0 to 2.0, as compared to the similar lens element 4 in the front of the system having a range from 3.0 to 5.0, comes from that fact.

The ranges of refractive indices for the lens elements of the four and fifth lens components follow quite closely the considerations already discussed for the first and second lens components where the first and fifth lens components where the first and fifth lens components are analogous and the second and fourth lens components are similarly analogous. The existing range of short flints by selection yields a starting point for lens element 9, as for lens element 3. The refractive indices of lens elements 8 and 10 of matching crown glass on either side of lens element 9 are thus seen to follow the prescribed index differences given in the fourth column, except that the lower bound for lens element 8 has been raised slightly to accord with design experience on the lower rim ray corrections.

A lens system in which parameters are randomly selected within the ranges of Table II or even as extreme values of the parameters would still afford a lens design yielding the advantages of the invention, although a random selection of extreme values most probably would not give optimum performance. However, a practical design is often an economic compromise. If certain glasses are dictated by economics or other specifications, certain points in the ranges of parameters are thereby determined, even though not necessarily of optimum design. Coupled with the effects of the limits of the ranges of the several parameters as described above (and, of course, lesser effects of the same kind show up as the limits are approached), Tables I and II constitute an adequate instruction of how to practice applicant's invention.

Assuming the design parameters of Table I and computing the coefficients $b$, $c$, $d$, and $e$ and the curvature C of Equation 2 as described above, the aspheric surfaces R7, R8, R9, and R10 may be determined by substituting the computed coefficients and curvatures of Table III in Equation 2.

TABLE III
[Equation 2 coefficients for aspheric surfaces]

| Surface | Coefficients | | | | Curvature C |
|---|---|---|---|---|---|
| | b | c | d | e | |
| R7 | 0.075113 | 47.2089 | −85.507 | 81,977 | −1.78188 |
| R8 | 18.4529 | −1.8374 | 21,724.5 | 0 | −3.54945 |
| R9 | −28.3438 | −905.30 | 20,253.8 | 0 | 4.79223 |
| R10 | −1.68612 | −9.1200 | 24.672 | 86,965 | 1.70827 |

Field tests on an objective lens system embodying the design parameters of Tables I, II, and III have indicated that the lens provides superior performance. In viewing scenes of high contrast ratios, resolutions of above 100 lines per millimeter are obtainable. Even with the usual aerial scene involving a medium-to-low contrast of the order of 2 to 1, resolution in excess of 80 lines per millimeter is obtainable. This compares with the typical performance of a telefoto lens with a relative aperture of $f/4$ which, at high contrast, provides a resolution of about 40 lines per millimeter. Such tests also show that the residual oblique spherical aberration at the corner of the format (7.5° off-axis), in the absence of vignetting for extreme skew ray, amounts to no more than a Rayleigh limit, that is, the error in optical path along any ray does not exceed ¼ wave of sodium light (5893 A.). It has also been shown that distortion is essentially negligible, being 0.000 millimeter, as calculated, even in the corner of the format along with the absence of any appreciable asymmetries of coma and color. This absence of distortion holds for incident light of wave lengths from 4861 to 7682 A.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A relatively wide angle apochromatic substantially symmetrical obective lens system comprising:
   (a) a first front lens component of net collective effect;
   (b) a fifth rear lens compenent of net collective effect;
   (c) second, third, and fourth spaced lens components disposed between said first and fifth lens components, each comprising at least three closely associated lens elements;
   (d) said second lens component having a net positive dioptric power and having index of refraction differences between adacent lens elements lying within the range 0.03 to 0.09 and including at least one element of negative dioptric power and a dispersive power for the blue-violet end of the spectrum characteristic of crown glass and having a concave exterior surface on the short conugate side of a curvature lying within the range 3 to 5 relative to the equivalent focal length of the system;
   (e) said third lens component being of generally biconcave form and having a net negative dioptric power and having index of refraction differences between adacent lens elements within the range of 0.02 to 0.12 and comprising two lens elements of positive dioptric power enclosing a third lens element of negative dioptric power;
   (f) said fourth lens component having a net positive dioptric power, having an over-all meniscus form with a convex exterior surface on the short conjugate side, having its interior surface on the short conjugate side convex to the long conjugate side of the system, and having index of refraction differences between adjacent lens elements within the range of 0.01 to 0.09 comprising at least one lens element of a dispersive power for the blue-violet end of the spectrum characteristic of crown glass;
   (g) the two outer lens elements of each of said second, third, and fourth lens components having higher indices of refraction and higher indices of dispersion $v$ than the central lens element thereof and at least one of the exterior surfaces and at least one of the interior surfaces of said third lens component being aspheric and effective substantially to correct respectively axial aberration and at least one type of off-axis aberration;
   (h) and each of said second and fourth lens components comprising two lens elements of positive dioptric power enclosing a third lens element of negative dioptric power, the two outer lens elements of each of said second, third, and fourth lens components having higher indices of refraction and higher indices or dispersion $v$ than the central lens element thereof and at least one of the exterior surfaces and at least one of the interior surfaces of said third lens component being aspheric and effective substantially to correct respectively axial aberration and at least one type of off-axis aberration.

2. A relatively wide angle apochromatic substantially symmetrical obective lens system comprising:
   (a) a first front lens component of net collective effect;
   (b) a fifth rear lens component of net collective effect;
   (c) second, third, and fourth spaced lens components disposed between said first and fifth lens components, each comprising a cemented lens triplet;
   (d) said second lens component having a net positive dioptric power and having index of refraction differences between adjacent lens elements lying within the range 0.03 to 0.09 and including at least one element of negative dioptric power and a dispersive power for the blue-violet end of the spectrum characteristic of crown glass and having a concave exterior surface on the short conjugate side of a curvature lying within the range 3 to 5 relative to the equivalent focal length of the system;
   (e) said third lens component being of generally biconcave form and having a net dioptric power and having index of refraction differences between adjacent lens elements within the range of 0.02 to 0.12 and comprising two lens elements of positive dioptric power enclosing a third lens element of negative dioptric power;
   (f) said fourth lens component having a net positive dioptric power, having an over-all meniscus form with a convex exterior surface on the short conjugate side, having its interior surface on the short conjugate side convex to the long conjugate side of the system, and having index of refraction differences between adjacent lens elements within the range of 0.01 to 0.09 comprising at least one lens element of a dispersive power for the blue-violet end of the spectrum characteristic of crown glass;
   (g) the two outer lens elements of each of said second, third, and fourth lens components having higher indices of refraction and higher indices of dispersion ν than the central lens element thereof and at least one of the exterior surfaces and at least one of the interior surfaces of said third lens component being aspheric and effective substantially to correct respectively axial aberration and at least one type of off-axis aberration;

(h) and each of said second and fourth lens components comprising two lens elements of positive dioptric power enclosing a third lens element of negative dioptric power, the two outer lens elements of each of said second, third, and fourth lens components having higher indices of refraction and higher indices or dispersion ν than the central lens element thereof and at least one of the exterior surfaces and at least one of the interior surfaces of said third lens component being aspheric and effective substantially to correct respectively axial aberration and at least one type of off-axis aberration.

3. A relatively wide angle apochromatic substantially symmetrical obective lens system comprising:

(a) a first front lens component of net collective effect;
(b) a fifth rear lens component of net collective effect;
(c) second, third, and fourth spaced lens components disposed between said first and fifth lens components, each comprising at least three closely associated lens elements;
(d) said second lens component having a net positive dioptric power and having index of refraction differences between adacent lens elements lying within the range 0.03 to 0.09 and including at least one element of negative dioptric power and a dispersive power for the blue-violet end of the spectrum characteristic of crown glass and having a concave exterior surface on the short conjugate side of a curvature lying within the range of 3 to 5 relative to the equivalent focal length of the system;
(e) said third lens component being of generally biconcave form and having a net negative dioptric power and comprising two lens elements of positive dioptric power enclosing a third lens element of negative dioptric power and having all interior and exterior surfaces of aspheric form effective substantially to correct axial and off-axis spherical aberration and coma and chromatic variations thereof;
(f) said fourth lens component having a net positive dioptric power, having an over-all meniscus form with a convex exterior surface on the short conjugate side, having its interior surface on the short conjugate side convex to the long conjugate side of the system, and having index of refraction differences between adjacent lens elements within the range of 0.01 to 0.09 comprising at least one lens element of a dispersive power for the blue-violet end of the spectrum characteristic of crown glass;
(g) the two outer lens elements of each of said second, third, and fourth lens components having higher indices of refraction and higher indices of dispersion ν than the central lens element thereof and at least one of the exterior surfaces and at least one of the interior surfaces of said third lens component being aspheric and effective substantially to correct respectively axial aberration and at least one type of off-axis aberration;
(h) and each of said second and fourth lens components comprising two lens elements of positive dioptric power enclosing a third lens element of negative dioptric power, the two outer lens elements of each of said second, third, and fourth lens components having higher indices of refraction and higher indices of dispersion ν than the central lens element thereof.

4. A relatively wide angle apochromatic substantially symmetrical obective lens system comprising:

(a) a first front lens component of net collective effect;
(b) a fifth rear lens component of net collective effect;
(c) second, third, and fourth spaced lens components disposed between said first and fifth lens components, each comprising at least three closely associated lens elements;
(d) said second lens component having a net positive dioptric power and having index of refraction differences between adacent lens elements lying within the range 0.03 to 0.09 and including at least one element of negative dioptric power and a dispersive power for the blue-violet end of the spectrum characteristic of crown glass and having a concave exterior surface on the short conjugate side of a curvature lying within the range of 3 to 5 relative to the equivalent focal length of the system;
(e) said third lens component being of generally biconcave form and having a net negative dioptric power and having index of refraction differences between adjacent lens elements within the range of 0.02 to 0.12 and comprising two lens elements of positive dioptric power enclosing a third lens element of negative dioptric power;
(f) said fourth lens component having a net positive dioptric power, having an over-all meniscus form with a convex exterior surface on the short conjugate side, having its interior surface on the short conjugate side convex to the long conjugate side of the system, and having index of refraction differences between adjacent lens elements within the range of 0.01 to 0.09 and having an index difference across its interior surface on the short conjugate side within the range 0.01 to 0.03 comprising at least one lens element of a dispersive power for the blue-violet end of the spectrum characteristic of crown glass;
(g) the two outer lens elements of each of said second, third, and fourth lens components having higher indices of refraction and higher indices of dispersion ν than the central lens element thereof and at least one of the exterior surfaces and at least one of the interior surfaces of said third lens component being aspheric and effective substantially to correct respectively axial aberration and at least one type of off-axis aberration;
(h) and each of said second and fourth lens components comprising two lens elements of positive dioptric power enclosing a third lens element of negative dioptric power, the two outer lens elements of each of said second, third, and fourth lens components having higher indices of refraction and higher indices of dispersion ν than the central lens element thereof and at least one of the exterior surfaces and at least one of the interior surfaces of said third lens component being aspheric and effective substantially to correct respectively axial aberration and at least one type of off-axis aberration.

5. A relatively wide angle apochromatic substantially symmetrical objective lens system comprising:

(a) a first front lens component of net collective effect;
(b) a fifth rear lens component of net collective effect;
(c) second, third, and fourth spaced lens components disposed between said first and fifth lens components, each comprising at least three closely associated lens elements;
(d) said second lens component having a net positive dioptric power and having index of refraction differences between adjacent lens elements lying within the range 0.03 to 0.09 and including at least one element of negative dioptric power and a dispersive power for the blue-violet end of the spectrum characteristic of crown glass and having a concave exterior surface on the short conjugate side of a curvature lying within the range of 3 to 5 relative to the equivalent focal length of the system;
(e) said third lens component being of generally biconcave form and having a net negative dioptric power and having index of refraction differences between adjacent lens elements within the range of 0.02 to 0.12 and comprising two lens elements of positive dioptric power enclosing a third lens element of negative dioptric power;

(f) said fourth lens component having a net positive dioptric power, having an over-all meniscus form with a convex exterior surface on the short conjugate side, having its interior surface on the short conjugate side convex to the long conjugate side of the system, and having index of refraction differences between adjacent lens elements within the range of 0.01 to 0.09 comprising at least one lens element of a dispersive power for the blue-violet end of the spectrum characteristic of crown glass;

(g) the two outer lens elements of each of said second, third, and fourth lens components having higher indices of refraction and higher indices of dispersion $v$ than the central lens element thereof and at least one of the exterior surfaces and at least one of the interior surfaces of said third lens component being aspheric and effective substantially to correct respectively axial aberration and at least one type of off-axis aberration;

(h) and each of said second and fourth lens components comprising two lens elements of positive dioptric power enclosing a third lens element of negative dioptric power;

(i) said second and fourth lens components including lens elements of positive dioptric powers having indices of refraction of at least 1.57, the two outer lens elements of each of said second, third, and fourth lens components having higher indices of refraction and higher indices of dispersion $v$ than the central lens element thereof and at least one of the exterior surfaces and at least one of the interior surfaces of said third lens component being aspheric and effective substantially to correct respectively axial aberration and at least one type of off-axis aberration.

6. A relatively wide angle apochromatic substantially symmetrical objective lens system comprising:

(a) a first front lens component of net collective effect and comprising a simple lens element;

(b) a fifth rear lens component of net collective effect and comprising a simple lens element;

(c) second, third, and fourth spaced lens components disposed between said first and fifth lens components, each comprising at least three closely associated lens elements;

(d) said second lens component having a net positive dioptric power and having index of refraction differences between adjacent lens elements lying within the range 0.03 to 0.09 and including at least one element of negative dioptric power and a dispersive power for the blue-violet end of the spectrum characteristic of crown glass and having a concave exterior surface on the short conjugate side of a curvature lying within the range of 3 to 5 relative to the equivalent focal length of the system;

(e) said third lens component being of generally biconcave form and having a net negative dioptric power and having index of refraction differences between adjacent lens elements within the range of 0.02 to 0.12 and comprising two lens elements of positive dioptric power enclosing a third lens element of negative dioptric power;

(f) said fourth lens component having a net positive dioptric power, having an over-all meniscus form with a convex exterior surface on the short conjugate side, having its interior surface on the short conjugate side convex to the long conjugate side of the system, and having index of refraction differences between adjacent lens elements within the range of 0.01 to 0.09 comprising at least one lens element of a dispersive power for the blue-violet end of the spectrum characteristic of crown glass;

(g) the two outer lens elements of each of said second, third, and fourth lens components having higher indices of refraction and higher indices of dispersion $v$ than the central lens element thereof and at least one of the exterior surfaces and at least one of the interior surfaces of said third lens component being aspheric and effective substantially to correct respectively axial aberration and at least one type of off-axis aberration;

(h) and each of said second and fourth lens components comprising two lens elements of positive dioptric power enclosing a third lens element of negative dioptric power, the two outer lens elements of each of said second, third, and fourth lens components having higher indices of refraction and higher indices of dispersion $v$ than the central lens element thereof and at least one of the exterior surfaces and at least one of the interior surfaces of said third lens component being aspheric and effective substantially to correct respectively axial aberration and at least one type of off-axis aberration.

7. A relatively wide angle apochromatic substantially symmetrical objective lens system comprising:

(a) a first front lens component of net collective effect;

(b) a fifth rear lens component of net collective effect;

(c) second, third, and fourth spaced lens components disposed between said first and fifth lens components, each comprising at least three closely associated lens elements;

(d) said second lens component having a net positive dioptric power and having index of refraction differences between adjacent lens elements lying within the range 0.03 to 0.09 and including at least one element of negative dioptric power and a dispersive power for the blue-violet end of the spectrum characteristic of crown glass and having a concave exterior surface on the short conjugate side of a curvature lying within the range 3 to 5 relative to the equivalent focal length of the system;

(e) said third lens component being of generally biconcave form and having a net negative dioptric power and having index of refraction differences between adjacent lens elements within the range of 0.02 to 0.12 and comprising two lens elements of positive dioptric power enclosing a third lens element of negative dioptric power;

(f) said fourth lens component having a net positive dioptric power, having an over-all meniscus form with a convex exterior surface on the short conjugate side, having its interior surface on the short conjugate side convex to the long conjugate side of the system, and having index of refraction differences between adjacent lens elements within the range of 0.01 to 0.09 comprising at least one lens element of a dispersive power for the blue-violet end of the spectrum characteristic of crown glass;

(g) the two outer lens elements of each of said second, third, and fourth lens components having higher indices of refraction and higher indices of dispersion $v$ than the central lens element thereof and at least one of the exterior surfaces and at least one of the interior surfaces of said third lens component being aspheric and effective substantially to correct respectively axial aberration and at least one type of off-axis aberration;

(h) each of said second and fourth lens components comprising two lens elements of positive dioptric power enclosing a third lens element of negative dioptric power;

(i) and an aperture stop disposed in the air space adjacent to the said concave exterior surface of said second lens component.

8. A relatively wide angle apochromatic substantially symmetrical object lens system comprising:
   (a) a first front lens component of net collective effect;
   (b) a fifth rear lens component of net collective effect;
   (c) second, third, and fourth spaced lens components disposed between said first and fifth lens components, each comprising at least three closely associated lens elements;
   (d) said second lens component having a net positive dioptric power and having index of refraction differences between adjacent lens elements lying within the range 0.03 to 0.09 and including at least one element of negative dioptric power and a dispersive power for the blue-violet end of the spectrum characteristic of crown glass and having a concave exterior surface on the short conjugate side of a curvature lying within the range of 3 to 5 relative to the equivalent focal length of the system;
   (e) said third lens component being of generally biconcave form and having a net negative dioptric power and having index of refraction differences between adjacent lens elements within the range of 0.02 to 0.12 and comprising two lens elements of positive dioptric power enclosing a third lens element of negative dioptric power;
   (f) said fourth lens component having a net positive dioptric power, having an over-all meniscus form with a convex exterior surface on the short conjugate side, having its interior surface on the short conjugate side convex to the long conjugate side of the system, and having index of refraction differences between adjacent lens elements within the range of 0.01 to 0.09 comprising at least one lens element of a dispersive power for the blue-violet end of the spectrum characteristic of crown glass;
   (g) the two outer lens elements of each of said second, third, and fourth lens components having higher indices of refraction and higher indices of dispersion $v$ than the central lens element thereof and at least one of the exterior surfaces and at least one of the interior surfaces of said third lens component being aspheric and effective substantially to correct respectively axial aberration and at least one type of off-axis aberration;
   (h) and each of said second and fourth lens components comprising two lens elements of positive dioptric power enclosing a third lens element of negative dioptric power;
   (i) the element or elements of the lens components having positive dioptric powers also having higher indices of refraction than those of lens elements having negative dioptric powers.

9. A relatively wide angle apochromatic objective lens system comprising eleven lens elements numbered 1 to 11, inclusive, in order from the short conjugate side of the system and having the parameters set forth in the following table in which R1, R2, R3 . . . represent the radii of curvature of the several lens surfaces counting from the long conjugate side of the lens system and in which the lens system has a nominal focal length of 1.00000 and a relative aperture $f/4$.

TABLE I

| Lens | Surface [1] Radii = R | | Thickness [1] (a = air) (g = glass) | Index of Refraction $n_d$ | Dispersion Index $v$ | Glass Type |
|---|---|---|---|---|---|---|
| 1 | R1 | 0.77304 | 0.03665g | 1.62041 | 60.29 | SK-16 Dense crown. |
| | R2 | plano | 0.00156a | | | |
| 2 | R3 | 0.38205 | 0.05459g | 1.60311 | 60.68 | SK-14 Dense crown. |
| | R4 | −0.64988 | | | | |
| 3 | R5 | 0.15723 | 0.02028g | 1.55781 | 53.84 | KzFS-2 S-Glass. |
| 4 | R6 | 0.27852 | 0.05771g | 1.60311 | 60.68 | SK-14 Dense crown. |
| | | | 0.05069a | | | |
| 5 | R7 | Aspheric | 0.02963g | 1.62041 | 60.29 | SK-16 Dense crown. |
| 6 | R8 | Aspheric | 0.01638g | 1.53172 | 48.87 | LLF-6 Extra light flint. |
| 7 | R9 | Aspheric | 0.03587g | 1.60311 | 60.68 | SK-14 Dense crown. |
| | R10 | Aspheric | 0.04243a | | | |
| 8 | R11 | −0.79292 | 0.04367g | 1.62041 | 60.29 | SK-16 Dense crown. |
| 9 | R12 | −0.26879 | 0.02340g | 1.55781 | 53.84 | KzFS-2. |
| 10 | R13 | 0.26195 | 0.05303g | 1.57250 | 57.48 | Ba K-1. |
| | R14 | −0.56106 | 0.00390a | | | |
| 11 | R15 | 1.11249 | 0.04679g | 1.62041 | 60.29 | SK-16 Dense crown. |
| | R16 | −1.88459 | 0.71615a | | | |

[1] The dimensions of surface radii and axial thickness of glass and air layers are in terms of decimal fractions of the paraxial focal length.

10. A relatively wide angle apochromatic objective lens system in accordance with claim 9 in which the aspheric surfaces of radii R7, R8, R9 and R10 are determined by the equation:

$$x = \frac{Cy^2}{1+\sqrt{1-C^2y^2}} + by^4 + cy^6 + dy^8 + ey^{10}$$

where:

$x$ and $y$ are the Cartesian coordinates of any point on the surface with the origin referred to the vertex of the surface $b, c, d,$ and $e$ are coefficients representing the aspheric departure of the point from a spherical surface of contact radius $C$ is the reciprocal of the radius of curvature at the vertex, the so-called contact radius, and is also the curvature at the vertex and in which the coefficients $b$, $c$, $d$, and $e$ and the curvature C have the values set forth in the following table:

| Surface | Coefficients | | | | Curvature C |
|---|---|---|---|---|---|
| | $b$ | $c$ | $d$ | $e$ | |
| R7 | 0.075113 | 47.2089 | −85.507 | 81,977 | −1.78188 |
| R8 | 18.4529 | −1.8374 | 21,724.5 | 0 | −3.54945 |
| R9 | −28.3438 | −905.30 | 20,253.8 | 0 | 4.79223 |
| R10 | −1.68612 | −9.1200 | 24.672 | 86,965 | 1.70827 |

No references cited.

JEWELL H. PEDERSEN, *Primary Examiner.*

R. J. STERN, *Assistant Examiner.*